United States Patent [19]

Hogsett et al.

[11] 4,338,287

[45] Jul. 6, 1982

[54] PROCESS FOR CONDITIONING TUNGSTEN CONCENTRATES

[75] Inventors: Robert F. Hogsett, Arvada; Dale K. Huggins, Golden; Leo W. Beckstead, Arvada, all of Colo.

[73] Assignee: Amax Inc., Greenwich, Conn.

[21] Appl. No.: 225,912

[22] Filed: Jan. 19, 1981

[51] Int. Cl.$^3$ ............................................. C01G 41/00
[52] U.S. Cl. ...................................... 423/53; 423/61; 423/58; 75/1 R
[58] Field of Search ................ 423/53, 61; 75/1, 47 R

[56] References Cited

U.S. PATENT DOCUMENTS 1,431,559  10/1922  Becket ................................... 423/61

FOREIGN PATENT DOCUMENTS 118750  8/1944  Australia ............................... 423/53

OTHER PUBLICATIONS

Yih et al., "Tungsten", Plenum Press, N.Y., 1979, pp. 82-83.

Primary Examiner—Herbert T. Carter
Attorney, Agent, or Firm—Michael A. Ciomek; Donald T. Black

[57] ABSTRACT

A process for conditioning a tungsten concentrate containing tungsten as $WO_3$, sulfur as sulfide, and calcite to fix at least a portion of the sulfur as calcium sulfate by reaction with the calcite, comprises providing a tungsten concentrate having a calcite content such that less than about 15 wt. % calcium sulfate based on the weight of the $WO_3$ in the concentrate will be formed and heating the concentrate to a temperature of at least about 500° C. in an oxidizing atmosphere to oxidize substantially all the sulfur in the concentrate to provide a conditioned concentrate having a calcium sulfate content less than about 15% based on the weight of the $WO_3$, whereby the conditioned concentrate can be efficiently leached with alkali metal carbonates or hydroxides and the resulting alkali metal tungstate solution can be effectively treated to recover an ammonium tungstate solution.

7 Claims, No Drawings

PROCESS FOR CONDITIONING TUNGSTEN CONCENTRATES

BACKGROUND OF THE INVENTION

The present invention relates generally to the recovery of tungsten, and in particular to its recovery from tungsten concentrates. More particularly, the present invention relates to conditioning tungsten concentrates prior to leaching the concentrates for production of an aqueous tungstate solution.

Tungsten (as $WO_3$) is customarily concentrated from associated material by any of several techniques, including froth flotation and gravity concentration. These techniques are effective to concentrate tungsten from feed material such as scheelite ($CaWO_4$) or wolframite ($(Fe, Mn)WO_4$) ore, or tungsten-bearing byproduct material formed in the recovery of other metals with which the tungsten is found. In froth flotation, the feed material is customarily crushed and slurried in water, one or more flotation agents such as conditioners, collectors, or frothers are added to the slurry, and the slurry is subjected to froth flotation to recover the scheelite as a flotation concentrate and to reject gangue. In gravity concentration, a slurry of crushed feed material is stratified in a moving stream of water, causing the various solid components of the slurry to collect in fractions roughly corresponding to the relative density thereof. Gravity concentrates are typically recovered in spiral classifiers and shaker tables.

The tungsten concentrate, however recovered, can then be leached in an aqueous alkaline solution of an alkali metal carbonate or hydroxide, to solubilize the tungsten values in an alkali metal tungstate leach liquor. The aqueous leach liquor can then be treated by various steps to further purify the tungsten, typically leading to a purified ammonium tungstate solution from which a solid ammonium tungstate produce can be recovered.

Tungsten flotation concentrates and gravity concentrates typically contain impurities which physically or chemically interfere with the leaching process and with subsequent purification steps. The impurities or their reaction products can enter into the leaching reaction, in which case they also undesirably consume leaching reagent. In particular, tungsten flotation and gravity concentrates tend to contain amounts up to several percent or more of sulfides, particularly as pyrrhotite (FeS) as well as pyrite ($FeS_2$) and chalcopyrite ($CuFeS_2$). Sulfides react with the alkaline leaching reagent, and form a variety of contaminant compounds which interfere with subsequent purification steps and which can reduce the purity of the product. It is therefore highly desirable to be able to treat tungsten concentrates prior to leaching thereof to remove sulfides from the concentrates.

Roasting sulfide-bearing concentrates to oxidize the sulfides partially or completely is a generally known expedient in a variety of contexts. Typically, sulfides are converted to gaseous sulfur dioxide, which is evolved and collected in a scrubber or other suitable emission control device. However, simply roasting tungsten concentrates to oxidize completely the sulfides contained therein can lead to reduced leaching efficiency as well. Tungsten concentrates typically contain calcium, present for instance as calcite ($CaCO_3$), in sufficient amounts to form substantial quantities of calcium sulfate in the roasted product by reaction with sulfur dioxide formed during roasting. Calcium sulfate reacts with the sodium carbonate agent used to leach the roasted concentrate, thereby increasing the amount of leaching reagent required for a given quantity of tungstate fed, and greatly reduces leaching efficiency. Calcium sulfate also adds to the overall solids load that must be handled in the tungsten recovery process.

Roasting calcite-containing scheelite concentrates presents the additional drawback that free lime, CaO, can be formed in the roasted product. When sodium carbonate is used as the leaching reagent, free lime present in the roasted concentrate can react with the sodium carbonate to form calcium carbonate and undesirable amounts of sodium hydroxide. The sodium hydroxide in turn reacts with silica and other impurities, thereby forming soluble compounds which contaminate the leach liquor and insoluble compounds which promote the formation of scale in the process equipment.

Accordingly, there is a need for a process for conditioning tungsten concentrates to oxidize sulfides therein which also permits efficient leaching of tungsten from the conditioned concentrate unimpeded by calcium-bearing byproducts. Such a conditioning process should be amenable to treatment of tungsten flotation and gravity concentrates having a range of sulfide and calcite contents.

SUMMARY OF THE INVENTION

In brief, the present invention is a process for conditioning tungsten concentrates containing sulfur as sulfide, and calcite to fix at least a portion of the sulfur as calcium sulfate by reaction with the calcite, which comprises providing a tungsten concentrate having a calcite content such that less than about 15 wt. % calcium sulfate based on the weight of the $WO_3$ in the concentrate will be formed and heating the concentrate to a temperature of at least about 500° C. in an oxidizing atmosphere to oxidize substantially all the sulfur in the concentrate to provide a conditioned concentrate having a calcium sulfate content less than about 15% based on the weight of the $WO_3$, whereby the conditioned concentrate can be efficiently leached with alkali metal carbonates or hydroxides and the resulting alkali metal tungstate solution can be effectively treated to recover an ammonium tungstate solution.

DETAILED DESCRIPTION OF THE INVENTION

The novel process of the present invention is effective to provide a conditioned tungstate concentrate which is suitable for alkaline leaching, using as starting materials a tungsten flotation concentrate, a tungsten gravity concentrate, or a suitable blend of the two types of concentrate as set forth below. The conditioned concentrate is particularly suited for leaching by the process described in the following patent applications, filed on even date herewith, which are assigned to the assignee of the present application: "Combined Autoclave Soda Digestion of Wolframite and Scheelite", Ser. No. 06/225,905, "Autoclave Soda Digestion of Scheelite On-Line Feedback Control", Ser. No. 06/225,910; "Autoclave Soda Digestion of Refractory Concentrates", Ser. No. 06/225,113; and "Autoclave Soda Digestion of Scheelite Concentrates", Ser. No. 06/225,914. The disclosures of these applications are hereby incorporated by reference herein.

Tungsten flotation concentrates suitable for use in the process of the present invention include tungsten concentrates produced by froth flotation techniques. Such techniques typically produce a flotation concentrate containing about 10 wt. % to about 70 wt. % tungsten (as $WO_3$). The flotation concentrate also typically contains one or more sulfides, in amounts up to about 10 wt. % and typically between about 0.2 wt % and about 2 wt. %. The flotation concentrates can also contain calcite, usually in amounts at least about 10 wt. % and up to about 70wt. %.

Tungsten gravity concentrates that can be treated in accordance with the process of the present invention include tungsten concentrates produced by gravity concentration techniques such as a spiral classifier or shaker table. The gravity concentrates thus produced typically contain at least about 25 wt. % tungsten (as $WO_3$), and advantageously about 40 wt. % to about 70 wt. % tungsten. Tungsten gravity concentrates generally contain significant amounts of sulfide, typically up to about 10 wt. %, although amounts up to about 25 wt. % are encountered. Gravity concentrates also contain calcite, typically in amounts of about 1 wt. % to about 20 wt. % calcite, although amounts up to about 30% or more can be encountered.

The term "sulfide" is used throughout this specification and the claims which follow to include compounds containing sulfur in a reduced state, particularly including $FeS_2$, $FeS$, $FeAsS$, and $CuFeS_2$.

To realize the advantages of the present invention, a tungsten concentrate is provided which contains tungsten as $WO_3$ and which also contains calcite and sulfur (as sulfide) in controlled amounts relative to each other and to the tungsten. The concentrate should contain calcite in an amount such that on subsequent roasting thereof the concentrate will contain calcium sulfate in an amount less than about 15% by weight of the tungsten as $WO_3$. Amounts of calcium sulfate in the roasted concentrate in excess of about 15% by weight of the tungsten as $WO_3$ are disadvantageous because they consume excessive amounts of the leaching reagent and unduly decrease the degree to which tungsten can be extracted in the subsequent leaching stage. More advantageously, the amount of calcium sulfate in the roasted concentrate should not exceed about 7% by weight of the tungsten as $WO_3$, and the amount of calcite in the concentrate to be roasted can be adjusted accordingly.

It is well within the ability of one skilled in this art to provide a tungsten concentrate having the desired relative amounts of calcite, sulfide, and tungsten described herein. On occasion, a concentrate can be roasted directly as it is received from flotation or gravity concentration operations, without intermediate treatment. It is an advantage of this invention that a concentrate of the desired composition can also be provided by suitable blending of two or more concentrates having known calcite, sulfide, and tungsten contents, even though the concentrates considered separately would not be suitable for roasting without encountering the difficulties discussed above.

The concentrate provided as discussed above is then roasted in an atmosphere which is oxidizing as to the sulfide sulfur, so as to oxidize substantially all the sulfide in the concentrate. Depending on the amounts of calcite and sulfide sulfur present in the concentrate, some or all of the oxidized sulfur reacts with the calcite to form calcium sulfate. Oxidized sulfide which does not react with calcite in the concentrate is evolved from the roaster as sulfur dioxide and can be recaptured in a suitable device such as a scrubber. Calcite which does not react with oxidized sulfide is substantially retained in the concentrate as calcite, although some calcite can be converted to free lime.

Tungsten flotation and gravity concentrates can also contain arsenic compounds, such as arsenopyrites. On conditioning the concentrate in accordance with this invention, the arsenic would be expected to behave in a manner similar to the sulfur in the concentrate forming a calcium arsenate.

Roasting should be carried out at a temperature of at least about 500° C. to ensure complete oxidation of sulfides present in the concentrate. Advantageously, organic flotation oils, collectors, frothers, and the like with which a tungsten flotation concentrate can be contaminated are also oxidized under these roasting conditions to carbon dioxide and water vapor. Since generally speaking, increasing the roasting temperature above about 650° C. promotes conversion of calcite to free lime (CaO), the roasting temperature should be adjusted so that the roasted concentrate contains no free lime or controlled amounts of free lime.

The production of free lime assumes a greater importance when treating scheelite concentrates because scheelite concentrates are digested with sodium carbonate in low carbon steel reactors. If excessive amounts of free lime are formed, excessive amounts of sodium hydroxide are produced during the digestion step thereby increasing caustic embrittlement. It should be noted however that small amounts of sodium hydroxide can be advantageous when digesting scheelite with sodium carbonate. When treating wolframite concentrates the production of free lime does not present any problems inasmuch as wolframite is digested with sodium hydroxide. The temperature at which a scheelite concentrated is roasted should accordingly be adjusted so that the amount of free lime formed is below about 15% by weight of the tungsten as $WO_3$, and more advantageously below about 7% by weight of the tungsten as $WO_3$. The concentrate to be conditioned can comprise a mixture of scheelite and wolframite, in which case the roasting temperature should be adjusted so that the amount of free lime formed is below about 15%, and more advantageously, below about 7%, by weight of the tungsten as $WO_3$ in the scheelite.

To these ends, roasting is advantageously carried out at about 500° C. to about 800° C., and more advantageously at about 600° C. to about 650° or 700° C. Roasting can be carried out in a kiln to which air or oxygen is supplied so as to establish an atmosphere which is oxidizing as to the sulfide in the concentrate. Roasting times can readily be selected with reference to the foregoing considerations; times of about 30 to about 150 minutes are generally satisfactory.

A significant feature of the present invention is the formation of a leachable tungsten concentrate which contains only controlled amounts of calcium sulfate and free lime so as not to present processing difficulties under alkaline leaching conditions. This feature does not depend on the particular alkaline leaching conditions employed. That is, a wide variety of alkaline leaching conditions may be employed to solubilize the tungsten values in the conditioned concentrate which is produced by this invention.

The invention is illustrated in the following Examples, which should be read as illustrative and not limiting in any way.

EXAMPLE I

Quantities of tungsten concentrate having the compositions set forth in Table A below were charged to a kiln and roasted at 600° C. in an air atmosphere. The quantities of calcium sulfate produced are also set forth in the Table. Essentially no free lime was formed in the roasted material. The roasted material was then leached with sodium carbonate in an aqueous system, at a $Na_2CO_3:WO_3$ weight ratio of 1.2:1 and an initial $Na_2CO_3$ concentration of 150 gpl at 400 psig pressure and 230° C. The degree of $WO_3$ extraction into solution is given in Table A. Essentially no sulfide products were detected in the roasted product.

TABLE A

| Concentrate in Feed | Roast Time, Min. | Feed $WO_3$ | Feed S | Feed $CaCO_3$ | Product $CaSO_4$ | Product, $CaSO_4$ as wt. % of $WO_3$ | % of $WO_3$ extracted |
|---|---|---|---|---|---|---|---|
| | | weight % of concentrate | | | | | |
| Flotation A | 40 | 44.8 | 0.3 | 20.3 | 1.06 | 2.4 | 99.9 |
| 67% Flot. B 33% Grav. D | 103 | 53.4 | 0.96 | 7.9 | 2.5 | 4.7 | 99.4 |
| 38% Flot. B 19% Grav. D 43% $CaCO_3$ | 120 | 30.4 | 0.63 | 47.5 | 2.0 | 6.6 | 99.2 |
| 53% Flot. B 27% Grav. D 20% $CaCO_3$ | 120 | 42.7 | 1.12 | 26.3 | 3.3 | 7.7 | 97.2 |
| Flotation C | 40 | 45.6 | 1.18 | 22.5 | 3.4 | 7.4 | |
| 75% Flot. C 25% $CaCO_3$ | 60 | 34.2 | 0.88 | 41.9 | 3.3 | 9.6 | 95.8 |
| Gravity E | 115 | 40.5 | 5.29 | 20.0 | 2.3 | 5.7 | 98.7 |
| 50% Grav. E 50% limestone | 123 | 20.2 | 2.6 | 60.0 | 7.1 | 35.1 | 85.7 |

EXAMPLE II

The effect of $CaSO_4$ on the leaching of scheelite concentrates was shown in a series of tests in which $CaSO_4$ was added to a scheelite concentrate and the resulting material was then leached with a leachant of 150 gpl $Na_2CO_3$ for 2 hours at 230° C. with 1.2 or 1.6 lb. $Na_2CO_3$ per lb. $WO_3$. For comparison the same concentrate was leached without addition of $CaSO_4$. Table B shows the tungsten content of the concentrate (as wt. % $WO_3$), the $Na_2CO_3:WO_3$ weight ratio, the amount of $CaSO_4$ added, (as wt. % of the concentrate to be leached and as wt. % of the $WO_3$), and the degree of tungsten extraction into solution. The data demonstrate that $CaSO_4$ adversely affects the tungsten extraction at a given amount of $Na_2CO_3$, and that the amount of $Na_2CO_3$ required to maintain a given level of tungsten extraction increases with increasing $CaSO_4$ content of the concentrate to be leached.

TABLE B

| Feed, wt. % $WO_3$ | Feed, wt. % $CaSO_4$ | $CaSO_4$, % of $WO_3$ | $Na_2CO_3:WO_3$ ratio | Tungsten Extraction, % |
|---|---|---|---|---|
| 24 | 0 | 0 | 1.2 | 99.5 |
| 22.8 | 5 | 21.9 | 1.2 | 95.7 |
| 21.8 | 10 | 45.4 | 1.2 | 80.0 |
| 21.8 | 10 | 45.4 | 1.6 | 98.8 |

What is claimed is:

1. A process for conditioning a tungsten concentrate selected from the group consisting of scheelite and wolframite concentrates and combinations thereof and containing sulfur as sulfide, and calcite to fix at least a portion of the sulfur as calcium sulfate by reaction with the calcite, which comprises providing a tungsten concentrate having a calcite content such that less than about 15 wt. % calcium sulfate based on the weight of the tungsten in the concentrate as $WO_3$ will be formed and heating the concentrate to a temperature of at least about 500° C. in an oxidizing atmosphere to oxidize substantially all the sulfur in the concentrate to provide a conditioned concentrate having a calcium sulfate content less than about 15% based on the weight of the tungsten as $WO_3$, provided that when the tungsten concentrate is scheelite it is heated so as to provide the conditioned concentrate with a free lime content less than about 15% based on the weight of the tungsten as $WO_3$, whereby the conditioned concentrate can be efficiently leached with alkali metal carbonates or hydroxides and the resulting alkali metal tungstate solution can be effectively treated to recover an ammonium tungstate solution.

2. The process of claim 1 wherein the concentrate to be conditioned is a wolframite concentrate.

3. The process of claim 1 wherein the concentrate to be conditioned is a scheelite concentrate, and said scheelite concentrate is heated to provide a conditioned concentrate having a free line content less that about 15% based on the weight of the tungsten as $WO_3$.

4. The process of claim 2 wherein the concentrate is heated to between about 500° C. and about 800° C.

5. The process of claim 3 wherein the concentrate is heated to between about 500° C. and about 700° C.

6. The process of claim 1, 2 or 3 wherein the tungsten concentrate prior to heating the concentrate has a calcite such that less than about 7 wt. % calcium sulfate based on the weight of the $WO_3$ in the concentrate will be formed.

7. The process of claim 1 wherein the concentrate to be conditioned comprises a mixture of a wolframite concentrate and a scheelite concentrate, which mixture is heated to provide a conditioned concentrate having a free lime content less than about 15% based on the weight of the tungsten as $WO_3$ in the scheelite concentrate.

* * * * *